United States Patent Office  3,118,929
Patented Jan. 21, 1964

3,118,929
PROCESSES FOR THE PREPARATION OF
TETRACYANOETHYLENE
Elmore Louis Martin, Wilmington, Del., assignor to E. I.
du Pont de Nemours and Company, Wilmington, Del.,
a corporation of Delaware
No Drawing. Filed Feb. 5, 1960, Ser. No. 6,836
10 Claims. (Cl. 260—465.8)

This invention is concerned with the discovery of certain new processes for the synthesis of tetracyanoethylene.
McKusick et al. (J. Am. Chem. Soc. 80, 2806 (1958)) and Sausen et al. (ibid., 2815) have shown that tetracyanoethylene is useful for reacting with a wide variety of compounds to prepare tricyanovinyl derivatives, particularly the tricyanovinyl dyes. Several methods of preparing tetracyanoethylene are known, including the reaction of malononitrile with a halogen (U.S. 2,794,823) and the dehalogenation of halomalononitriles (U.S. 2,794,824).

There have now been discovered new and surprisingly useful processes for the preparation of tetracyanoethylene by the vapor-phase reaction of a per(chlorocyano)ethylene or per(chlorocyano)ethane containing one, two, or three cyano groups, no more than two of which are attached to any one carbon atom, with hydrogen cyanide at a temperature in excess of 250° C. The terms "per(chlorocyano)ethylene" and "per(chlorocyano)ethane" mean that both cyano and chloro groups are present, their total number being sufficient to replace all the hydrogens of ethylene or ethane, as the case may be.

In this process trichloroacrylonitrile, the three isomeric dichlorodicyanoethylenes, i.e., dichlorofumaronitrile, dichloromaleonitrile, and 1,1-dichloro-2,2-dicyanoethylene (dichloromethylenemalononitrile), tricyanovinyl chloride, pentachloropropionitrile, chlorotrichloromethylmalononitrile (1,1-dicyanotetrachloroethane), tetrachlorosuccinonitrile, or 1,1,2-trichloro-1,2,2-tricyanoethane may be used interchangeably or in admixture without any substantial effect on the reaction or the formation of tetracyanoethylene.

In carrying out the reaction of this invention, it is only necessary that an intimate mixture of the selected per(chlorocyano)ethylene or per(chlorocyano)ethane and hydrogen cyanide be heated in the vapor state at a temperature of 250° C. or above until tetracyanoethylene is formed. The higher the temperature employed, the shorter the time required for the formation of tetracyanoethylene. Thus, by employing extremely short reaction times, it is possible to operate this process at temperatures in the range of 1200–1500° C. and above without undue decomposition of the reactants and products. For practical purposes, temperatures in the range of 300–1000° C. are preferred and particularly temperatures in the range of 350–600° C. since in these ranges larger yields of tetracyanoethylene are obtained.

To facilitate control of the length of time the reactants are exposed to the reaction temperature, it is convenient, though not essential, to carry out this process in a continuous manner and to employ as a carrier an inert vapor diluent. The diluent serves to carry the reactants into and out of the heated reaction zone in a controllable manner and does not participate in the reaction. Suitable diluents or carriers include nitrogen, hydrogen, argon, helium, methane, benzene, toluene, xylene, acetonitrile, and the like. A mixture of two or more diluents may be used. However, the presence of a carrier is not essential. For example, when a solution of dichlorofumaronitrile in hydrogen cyanide is vaporized and passed at atmospheric pressure through a tube having a zone heated at 350–500° C., solid tetracyanoethylene condenses on the cooler portions of the tube beyond the heated zone.

In the continuous method of carrying out this process, improved heat transfer in bringing the reactant vapors to the reaction temperature may be obtained by employing a heating zone with a small cross section or by passing the reactant vapors through a heating zone that is packed with an inert heat transfer material, such as rings, beads, cylinders, or "saddles" of glass, ceramic material, metal, or the like.

The process of this invention is fully operable without any added catalyst. However, it has been found that the presence of certain materials during the reaction results in improved yields, and to this extent, the optional use of a catalyst represents the preferred practice of the invention. A wide variety of materials has been found to catalyze the vapor-phase reaction of the selected per(chlorocyano)ethylenes or per(chlorocyano)ethanes with hydrogen cyanide to yield tetracyanoethylene. For example, the reaction is catalyzed by activated carbon and by the transition metal elements and their derivatives, particularly their oxides, halides, and cyanides, including mixed cyanides with non-transition metals. By "transition metal element" is meant an element in which the outer electron group of the ion has greater than eight and less than 18 electrons (N. V. Sidgwick, "The Chemical Elements and Their Compounds," Oxford University Press, 1950, page 104). Thus, there are included the metals from scandium to zinc having atomic numbers of 21 to 30 inclusive, the metals from yttrium to cadmium having atomic numbers from 39 to 48 inclusive, the metals from lanthanum to mercury having atomic numbers from 57 to 80 inclusive, and the metals starting with actinium which have atomic numbers of 89 and above. The catalyst may be supported, if desired, on carbon, silica, alumina, titania, or other well-known catalyst supports. Preferred catalysts include (1) the oxides of chromium, cobalt, copper, magnesium, silver, and titanium, (2) complex salts such as potassium silver cyanide, potassium ferricyanide, potassium mercuricyanide, (3) the noble metals palladium and platinum on charcoal, and (4) activated carbon. Particularly preferred catalysts include $Cr_2O_3$, MgO, and $NiMoO_2$.

Pressure is not a critical factor in the process of this invention and pressures both above and below atmospheric pressure are operable.

In general the hydrogen cyanide used in the processes of this invention should not be permitted to dimerize or otherwise polymerize or condense. For this reason, while pressures can conveniently be moderately increased, I prefer to avoid high pressures because of the consequent possible condensation of hydrogen cyanide. Condensation of hydrogen cyanide is undesirable because it effects a loss of HCN reactant in the processes of this invention.

It is evident that the reaction of this invention involves at least one mole of hydrogen cyanide for each mole of the selected per(chlorocyano)ethylene or per(chlorocyano)ethane converted to tetracyanoethylene. However, this in no way limits the proportions in which these reactants may be brought together in the vapor phase to carry out the process. Thus, molar ratios from 50:1 to 1:50 in the vapor mixture may be employed, although highest yields are obtained when the ratio is approximately in the range 10:1 to 4:1.

The processes of this invention can be conducted in any convenient or conventional reaction vessel. Composition of the vessel walls is not critical; thus, they can be composed of such materials as glass, silica, "Monel" (a trademark of International Nickel Company for its line of high nickel-copper corrosion-resistant alloys), "Hastelloy" (a trademark of Haynes Stellite Company for its high-temperature nickel-base alloys), platinum, palladium, silver, and the like.

Tetracyanoethylene may be isolated from excess starting materials in this process by cooling the reaction products to room temperature, evaporating off any hydrogen cyanide or solvent carrier, and then extracting the residue with petroleum ether which dissolves unchanged per-(chlorocyano)ethylene or per(chlorocyano)ethane and leaves tetracyanoethylene undissolved. The resulting tetracyanoethylene may be further purified by recrystallization, sublimation, or other means known in the art.

In the following examples, parts are by weight unless otherwise specified.

EXAMPLE I

A fused silica tube with a diameter to length ratio of approximately 1:19 is provided with external electrical heating means along two thirds of its length and is fitted with a fused silica thermocouple well running the length of the center of the tube and having an outside diameter approximately one fourth the inside diameter of the tube. Starting from the inlet end of the tube, the first half of the heated zone is packed with hollow borosilicate glass cylinders having a length and an outside diameter both about one fourth the diameter of the tube. This packing serves as heat exchange material to bring the reactants to the reaction temperature. The next one fourth of the heated zone is packed with the catalyst, if a catalyst is used. Otherwise it is packed with glass cylinders as in the first half of the heated zone. Reaction temperatures are observed by a thermocouple in the middle of this catalyst zone. The final one fourth of the heated zone is packed with glass cylinders as in the first half of the heated zone. The tube is mounted vertically and fitted with inlet means at the top and outlet, cooling and collecting means at the bottom.

To a solution of 500 parts of dichlorofumaronitrile in 700 parts of liquid hydrogen cyanide is added about 1320 parts of benzene as a carrier. The resulting solution is introduced slowly and continuously through the inlet of the reaction tube described above during the course of 43 minutes. The catalyst zone of the tube is packed with a commercial grade of activated carbon (Darco G-60), and the temperature of the catalyst zone is maintained at 500° C. Under these conditions the reactants vaporize completely on contact with the packing material and spend approximately three seconds in contact with the activated carbon. The effluent vapors are cooled to 0° C., and the liquid that condenses is collected in a glass receiver. At the end of the run any reactants and products remaining in the tube are swept through with nitrogen. Hydrogen cyanide and benzene are evaporated from the liquid condensate under reduced pressure. The solid residue is extracted with excess petroleum ether to remove unreacted dichlorofumaronitrile, leaving crude tetracyanoethylene as a crystalline solid. This solid is dissolved in benzene. The resulting solution is heated with activated carbon, filtered, and evaporated to dryness. The remaining tetracyanoethylene is further purified by sublimation at 0.2 mm. and 130–140° C. to yield 15 parts of colorless crystals of tetracyanoethylene melting at 195–196° C. (sealed tube). The tetracyanoethylene is further identified (*a*) by its infrared absorption spectrum, (*b*) by formation of colored Pi complexes with benzene (yellow), xylene (red), anisole (burgundy), and anthracene (transient green), and (*c*) by its reaction with N,N-dimethylaniline, first to form the blue charge-transfer compound, the color changing within a few sec-

*Table I*

| Example | Per(chlorocyano)ethylene or -ethane | | Hydrogen Cyanide, Parts | Diluent | | Additional Carrier Gas | Catalyst (and Support)[c] | Temp., °C. | Space Velocity |
|---|---|---|---|---|---|---|---|---|---|
| | Compound[a] | Parts | | Compound[b] | Parts | | | | |
| II | 1 | 5 | 9 | | | $N_2$ | $NiO_2$ on $SiO_2$ | 375 | 675 |
| III | 1 | 5 | 7 | | | $N_2$ | none | 650 | 130 |
| IV | 1 | 5 | 7 | B | 9 | $N_2$ | $NiO_2$ on C | 375 | 810 |
| V | 1 | 5 | 7 | B | 9 | $N_2$ | $NiO_2$ on C | 500 | 505 |
| VI | 1 | 5 | 7 | B | 13 | $N_2$ | CuO on C | 350 | 690 |
| VII | 1 | 5 | 7 | B | 13 | $N_2$ | CuO on C | 450 | 380 |
| VIII | 1 | 5 | 7 | B | 13 | $N_2$ | CuO on C | 550 | 830 |
| IX | 1 | 5 | 7 | B | 13 | $N_2$ | CoO on C | 450 | 830 |
| X | 1 | 5 | 7 | B | 13 | $N_2$ | Pd on C | 450 | 830 |
| XI | 1 | 5 | 7 | B | 13 | $N_2$ | Pd on C | 520 | 1,035 |
| XII | 1 | 5 | 7 | B | 13 | $N_2$ | Pt on C | 500 | 770 |
| XIII | 1 | 5 | 7 | B | 13 | $N_2$ | $KAg(CN)_2$ on C | 475 | 690 |
| XIV | 1 | 5 | 7 | B | 13 | $N_2$ | $KAg(CN)_2$ on $SiO_2$ | 500 | 575 |
| XV | 2 | 5 | 7 | B | 13 | $N_2$ | $KAg(CN)_2$ on $SiO_2$ | 500 | 1,150 |
| XVI | 2 | 5 | 7 | B | 13 | $N_2$ | $KAg(CB)_2$ on $SiO_2$ | 500 | 830 |
| XVII | 1 | 5 | 7 | B | 13 | $N_2$ | $K_3Fe(CN)_6$ on C | 500 | 690 |
| XVIII | 1 | 5 | 7 | B | 13 | $N_2$ | $K_2Hg(CN)_4$ on C | 450 | 830 |
| XIX | 1 | 5 | 7 | B | 13 | $N_2$ | $Cr_2O_3$ | 400 | 1,035 |
| XX | 1 | 5 | 7 | B | 13 | $N_2$ | $Cr_2O_3$ | 400 | 440 |
| XXI | 1 | 5 | 7 | B | 13 | $N_2+H_2$ | $Cr_2O_3$ | 400 | 530 |
| XXII | 1 | 5 | 7 | B | 13 | $N_2$ | $Cr_2O_3$ on C | 400 | 780 |
| XXIII | 1 | 5 | 7 | B | 13 | $N_2$ | $Cr_2O_3$ on $Al_2O_3$ | 400 | 690 |
| XXIV | 1 | 5 | 7 | B | 13 | $N_2$ | $MoO_3$ on $Al_2O_3$ | 400 | 530 |
| XXV | 1 | 5 | 7 | T | 13 | $N_2$ | $MoO_3$ on $Al_2O_3$ | 400 | 520 |
| XXVI | 1 | 5 | 7 | X | 13 | $N_2$ | $MoO_3$ on $Al_2O_3$ | 400 | 520 |
| XXVII | 1 | 5 | 7 | B | 13 | $N_2$ | $TiO_2$ on $TiO_2$ | 450 | 270 |
| XXVIII | 1 | 5 | 7 | B | 13 | $N_2$ | $TiO_2$ on C | 500 | 690 |
| XXIX | 1 | 5 | 7 | B | 13 | $N_2$ | $WO_3$ on $Al_2O_3$ | 400 | 520 |
| XXX | 1 | 5 | 7 | B | 13 | $N_2$ | $WO_3$ on $SiO_2$ | 400 | 340 |
| XXXI | 1 | 5 | 7 | A | 8 | $N_2$ | $WO_3$ on $SiO_2$ | 425 | 1,000 |
| XXXII | 1 | 5 | 7 | B | 13 | $N_2$ | $MnO_2$ on C | 500 | 1,035 |
| XXXIII | 1 | 5 | 7 | B | 13 | $N_2$ | $Th_2O_3$ on $SiO_2$ | 475 | 430 |
| XXXIV | 1 | 5 | 7 | B | 13 | $N_2$ | $Ag_2O$ on C | 500 | 1,150 |
| XXXV | 1 | 5 | 7 | B | 13 | $N_2$ | $V_2O_3$ on $SiO_2$ | 450 | 450 |
| XXXVI | 1 | 5 | 7 | B | 13 | $N_2$ | NaF on C | 475 | 480 |
| XXXVII | 1 | 5 | 7 | B | 13 | $N_2$ | AgF on C | 400 | 680 |
| XXXVIII | 1 | 5 | 7 | B | 13 | $N_2$ | $CaCl_2$ on C | 450 | 610 |
| XXXIX | 1 | 5 | 7 | B | 13 | $N_2$ | NiO on C | 400 | 690 |
| XL | 3 | 5 | 7 | B | 13 | $N_2$ | NiO on C | 400 | 690 |
| XLI | 4 | 5 | 7 | B | 13 | $N_2$ | NiO on C | 400 | 690 |
| XLII | 5 | 5 | 7 | B | 13 | $N_2$ | $Cr_2O_3$ | 400 | 340 |
| XLIII | 1 | 5 | 7 | B | 13 | $N_2$ | $MgO \cdot Al_2O_3$ (spinel) | 350 | 515 |
| XLIV | 1 | 5 | 7 | B | 13 | $N_2$ | $NiMoO_2$ | 350 | 530 |
| XLV | 1 | 5 | 7 | B | 13 | $N_2$ | MgO | 400 | 520 |

[a] 1=dichlorofumaronitrile; 2=dichloromaleonitrile; 3=1,1-dichloro-2,2-dicyanoethylene; 4=tricyanovinyl chloride; 5=tetrachlorosuccinonitrile.
[b] A=acetonitrile; B=benzene; T=toluene; X=xylene.
[c] C as a catalyst support refers to coconut charcoal manufactured especially for use as a catalyst support and having a high surface area (about 1000 sq. m./g.) and a bulk density of about 0.4.

onds to magenta with the formation of 4-tricyanovinyl-N,N-dimethylaniline.

Table I summarizes other examples of this invention using the procedure of Example I in which different reactants, catalysts, and reaction conditions are used and from which tetracyanoethylene is obtained. In these examples the additional carrier gas is passed through the reactor at a space velocity of 1–10. Space velocity is defined as the volume of reactants per volume of the reactor per hour at 0° C. and 760 mm. pressure. The value given refers to the total charge passing through the tube. The condensate from the reactor is concentrated under reduced pressure at 50° C. and the residue is treated with petroleum ether to remove unreacted starting material. The petroleum ether-insoluble portion, which consists of crude tetracyanoethylene is further washed with petroleum ether, and is then dissolved in benzene. The benzene solution is heated with activated carbon and filtered. The tetracyanoethylene in the filtrate is identified (a) by its formation of colored Pi complexes with benzene (yellow), xylene (red), anisole (burgundy), and anthracene (transient green), and (b) by its reaction with N,N-dimethylaniline, first to form the blue charge-transfer compound, the color changing within a few seconds to magenta with the formation of 4-tricyanovinyl-N,N-dimethylaniline.

When trichloroacrylonitrile (Angew. Chem., A–60, 311 (1948), pentachloropropionitrile, 1,1-dicyanotetrachloroethane (U.S. 2,774,783), and 1,1,2-trichloro-1,2,2-tricyanoethane are substituted, respectively, for dichlorofumaronitrile in the procedure of Example I, tetracyanoethylene is obtained.

Tricyanovinyl chloride for use in this invention may be prepared by the process of Dickinson as shown in application S.N. 753,424, filed August 6, 1958, and allowed on November 30, 1959, now U.S. Patent 2,942,022.

Pentachloropropionitrile is prepared from trichloroacrylonitrile by the addition of chlorine across the double bond in the usual manner. 1,1,2-trichloro-1,2,2-tricyanoethane is similarly prepared from tricyanovinyl chloride by the addition of chlorine.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process of preparing tetracyanoethylene which consists essentially of contacting a member selected from the class consisting of trichloroacrylonitrile, dichlorofumaronitrile, dichloromaleonitrile, 1,1-dichloro-2,2-dicyanoethylene, tricyanovinyl chloride, pentachloropropionitrile, 1,1-dicyanotetrachloroethane, tetrachlorosuccinonitrile, 1,1,2-trichloro-1,2,2-tricyanoethane and mixtures thereof, with hydrogen cyanide in the vapor phase at a temperature of 250–1500° C.

2. The process of claim 1 wherein such contacting is conducted in the presence of a material selected from the group consisting of activated carbon, transition metal elements and the oxides, halides and cyanides of transition metal elements.

3. The process of claim 2 wherein the catalyst is $Cr_2O_3$.

4. The process of claim 2 wherein the catalyst is MgO.

5. The process of claim 2 wherein the catalyst is $NiMoO_2$.

6. A process of preparing tetracyanoethylene which consists essentially of contacting dichlorofumaronitrile with hydrogen cyanide in the vapor phase at a temperature of 250–1500° C. and in the presence of a catalyst selected from the class consisting of activated carbon, transition metal elements and oxides, halides and cyanides of transition metal elements.

7. A process of preparing tetracyanoethylene which consists essentially of contacting dichloromaleonitrile with hydrogen cyanide in the vapor phase at a temperature of 250–1500° C. and in the presence of a catalyst selected from the class consisting of activated carbon, transition metal elements and oxides, halides and cyanides of transition metal elements.

8. A process of preparing tetracyanoethylene which consists essentially of contacting 1,1-dichloro-2,2-dicyanoethylene with hydrogen cyanide in the vapor phase at a temperature of 250–1500° C. and in the presence of a catalyst selected from the class consisting of activated carbon, transition metal elements and oxides, halides and cyanides of transition metal elements.

9. A process of preparing tetracyanoethylene which consists essentially of contacting tricyanovinyl chloride with hydrogen cyanide in the vapor phase at a temperature of 250–1500° C. and in the presence of a catalyst selected from the class consisting of activated carbon, transition metal elements and oxides, halides and cyanides of transition metal elements.

10. A process of preparing tetracyanoethylene which consists essentially of contacting tetrachlorosuccinonitrile with hydrogen cyanide in the vapor phase at a temperature of 250–1500° C. and in the presence of a catalyst selected from the class consisting of activated carbon, transition metal elements and oxides, halides and cyanides of transition metal elements.

References Cited in the file of this patent

UNITED STATES PATENTS

| | | |
|---|---|---|
| 2,467,373 | Dutcher et al. | Apr. 19, 1949 |
| 2,680,761 | Halliwell | June 8, 1954 |
| 2,774,783 | Ardis | Dec. 18, 1956 |
| 2,794,823 | Heckert | June 4, 1957 |

OTHER REFERENCES

Brintzinger et al.: Angew. Chem., A–60, 311–312 (1948).